US008634099B2

(12) United States Patent
Machii et al.

(10) Patent No.: US 8,634,099 B2
(45) Date of Patent: Jan. 21, 2014

(54) CONFIGURATION DATA MANAGEMENT SYSTEM, PRINTER, AND ELECTRONIC DEVICE CONTROL METHOD

(75) Inventors: Kensuke Machii, Matsumoto (JP); Jinichi Nakamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 540 days.

(21) Appl. No.: 13/023,448

(22) Filed: Feb. 8, 2011

(65) Prior Publication Data
US 2011/0205581 A1 Aug. 25, 2011

(30) Foreign Application Priority Data

Feb. 9, 2010 (JP) ................................. 2010-026059

(51) Int. Cl.
*G06K 15/00* (2006.01)
(52) U.S. Cl.
USPC ........................................ 358/1.16; 711/115
(58) Field of Classification Search
USPC ........................................................ 358/1.16
See application file for complete search history.

(56) References Cited

U.S. PATENT DOCUMENTS

| 6,101,576 A * | 8/2000 | Kobayashi et al. | 711/122 |
| 2003/0016380 A1* | 1/2003 | Akitaya et al. | 358/1.14 |
| 2004/0105126 A1* | 6/2004 | Minowa et al. | 358/1.18 |
| 2004/0190073 A1* | 9/2004 | Kato et al. | 358/400 |
| 2008/0030782 A1* | 2/2008 | Watanabe | 358/1.16 |
| 2008/0068643 A1* | 3/2008 | Yasunaga | 358/1.15 |
| 2008/0231895 A1* | 9/2008 | Yamazaki | 358/1.15 |
| 2008/0243940 A1* | 10/2008 | Kato | 707/200 |
| 2009/0262382 A1 | 10/2009 | Nobutani | |

FOREIGN PATENT DOCUMENTS

| JP | 2004-013718 A | 1/2004 |
| JP | 2004-328288 A | 11/2004 |
| JP | 2007-074346 A | 3/2007 |
| JP | 2008-210035 A | 9/2008 |

* cited by examiner

*Primary Examiner* — Benjamin O Dulaney
(74) *Attorney, Agent, or Firm* — Kilpatrick Townsend & Stockton LLP

(57) ABSTRACT

An electronic device includes a storage unit that stores configuration data related to the electronic device, a configuration data writing unit that writes configuration data from the storage unit to the external storage device when electronic device power turns off, a configuration data updating unit that, after the configuration data is written to the external storage device, executes a deletion process to delete the configuration data in the storage unit, or an initialization process that resets the configuration data in the storage unit to a default initialization value, a configuration data reading unit that reads the configuration data from the external storage device when electronic device power turns on, a configuration unit that configures the electronic device based on the read configuration data, and a configuration data deletion unit that deletes the configuration data stored in the external storage device after the configuration unit completes configuring the electronic device.

10 Claims, 10 Drawing Sheets

FIG. 5A (A) BACK

FIG. 5B (B) FRONT

CONFIGURATION DATA MANAGEMENT SYSTEM, PRINTER, AND ELECTRONIC DEVICE CONTROL METHOD

This application claims priority to Japanese Patent Application No. 2010-026059, filed Feb. 9, 2010, the entirety of which is incorporated by reference herein.

BACKGROUND

1. Technical Field

The present invention relates to a configuration data management system for managing configuration parameters that are set in an electronic device, to a printer, and to an electronic device control method.

2. Related Art

Japanese Unexamined Patent Appl. Pub. JP-A-2004-13718 teaches a method of configuring an electronic device using a memory card or other type of external storage medium. JP-A-2004-13718 describes a configuration including a display terminal (first electronic device), a network camera (second electronic device), and a memory card. Configuration data is first input on the display terminal device to create a configuration file. The memory card is loaded into the display terminal device and the configuration file is copied to the memory card. The memory card is then loaded into the network camera, the network camera reads the configuration file from the memory card, and the network camera configures itself based on the information in the read configuration file.

When electronic devices are configured as described above and a particular electronic device (electronic device A) is configured using a memory card, the same memory card may then be mistakenly used to configure an electronic device other than electronic device A (such as electronic device B). When this happens, the configuration parameters of both electronic device A and electronic device B will be identically set. This means that if the configuration parameters include information that is specific to a particular device (information that must be unique), such as an IP address, the same IP address will be used by plural devices on the network and normal communication with each device will not be possible.

SUMMARY

A configuration data management system, a printer, and an electronic device control method according to the invention can reliably prevent setting the same configuration data in plural devices when electronic devices are configured using an external storage device.

A configuration data management system according to a first aspect of the invention includes an electronic device, and an external storage device connected to the electronic device. The electronic device includes a storage unit that stores configuration data related to the electronic device, a configuration data writing unit that writes configuration data stored in the storage unit to the external storage device when electronic device power turns off, a configuration data updating unit that, after the configuration data is written to the external storage device, executes a deletion process to delete the configuration data in the storage unit, or an initialization process that resets the configuration data in the storage unit to a predetermined default initialization value, a configuration data reading unit that reads the configuration data from the external storage device when electronic device power turns on, a configuration unit that configures the electronic device based on the read configuration data, and a configuration data deletion unit that deletes the configuration data stored in the external storage device after the configuration unit completes configuring the electronic device.

Another aspect of the invention is a control method for an electronic device that can connect to an external storage device and has a storage unit that stores configuration data related to the electronic device, the control method including: a configuration data writing step that writes configuration data stored in the storage unit to the external storage device when electronic device power turns off; a configuration data updating step that, after the configuration data is written to the external storage device, executes a deletion process to delete the configuration data in the storage unit, or an initialization process that resets the configuration data in the storage unit to a predetermined default initialization value; a configuration data reading step that reads the configuration data from the external storage device when electronic device power turns on; a configuration step that configures the electronic device based on the read configuration data; and a configuration data deletion step that deletes the configuration data stored in the external storage device after the configuration step completes configuring the electronic device.

In the configuration data management system, the configuration data preferably includes specific information that is uniquely assigned to identify the electronic device; and the configuration data deletion unit deletes at least the specific information in the configuration data stored in the external storage device.

When the electronic device turns off (shuts down), these aspects of the invention write the configuration data of the electronic device to the external storage device and then erase the configuration data from the electronic device. When the power turns on, the configuration data read from the external storage device is set in the electronic device, and the configuration data is then deleted from the external storage device. The configuration data is therefore stored only in the electronic device or the external storage device, but not in both (that is, the configuration data is only stored in one place at a time). As a result, when electronic devices are configured using an external storage device, accidentally setting the same configuration data in plural devices at the same time can be reliably prevented. More particularly, because specific information can be reliably erased from the external storage device after configuring the electronic device is completed, accidentally setting the same unique specific information in plural devices can be reliably prevented. When an electronic device is replaced, the configuration data that was set in the original device can be easily moved to the electronic device replacing the original device, which is particularly convenient.

Examples of specific information include an IP address, a computer name, and a Universally Unique Identifier (UUID).

In a configuration data management system according to another aspect of the invention, the configuration unit preferably sets the configuration data read from the external storage device as the configuration data of the electronic device when configuration data is not stored in the storage unit of the electronic device, or when the configuration data stored in the storage unit is the default initialization value.

With this aspect of the invention, the electronic device resets based on the configuration data in the external storage device only when configuration data is not set in the electronic device or when the configuration data is the default setting. More specifically, when an external storage device storing the configuration data for another device is connected to a device that is already correctly configured, the configuration data is not reflected (the configuration data is not reset), and mistakenly changing correct settings can be prevented. Note that the default settings are stored by the manufacturer in ROM, for example, when the electronic device is shipped.

In a configuration data management system according to another aspect of the invention, the electronic device preferably also includes a temporary storage unit that temporarily stores the configuration data read by the configuration data reading unit; and the configuration unit configures the electronic device based on the configuration data stored in the temporary storage unit.

This aspect of the invention first stores the configuration data read from the external storage device to a temporary storage unit (temporary storage area), and the electronic device is then configured based on this temporarily stored configuration data. For example, when the electronic device is configured without using (without going through) a temporary storage unit, an error occurs while reading the configuration data, and reading the configuration data is incomplete, some of the settings in the electronic device may be corrupted (set indiscriminately). The invention prevents this from happening, and enables configuring reliably.

In a configuration data management system according to another aspect of the invention, the configuration data deletion unit preferably issues a delete command to the external storage device to delete the configuration data stored in the external storage device after the configuration unit completes configuration; and the external storage device deletes the configuration data stored in the external storage device based on the command from the configuration data deletion unit.

This aspect of the invention enables reliably deleting the configuration data stored in the external storage device after the settings are completed in the electronic device.

In a configuration data management system according to another aspect of the invention, the electronic device preferably also includes a temporary storage completion report transmission unit that sends to the external storage device a temporary storage completion report indicating that the configuration data read by the configuration data reading unit was stored in the temporary storage unit; and the external storage device deletes the configuration data stored in the external storage device when the delete command is not received within a specified time after receiving the temporary storage completion report.

Even if the external storage device is disconnected from the electronic device before the delete command is received from the electronic device, and a delete command cannot reach the external storage device, this aspect of the invention enables reliably deleting the configuration data from the external storage device.

In a configuration data management system according to another aspect of the invention, the electronic device preferably deletes the configuration data stored in the temporary storage unit when a specified time has passed after the delete command is output.

This aspect of the invention enables erasing configuration data stored in the temporary storage unit when a specific time has passed after the delete command is issued, that is, after configuring the electronic device is completely finished.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is a flow chart of a process executed when the printer according to the first embodiment of the invention turns on.

FIG. 9 is a flow chart of a process executed when the printer according to the second embodiment of the invention turns on.

FIG. 10 is a flow chart of a process executed on the cable set side when the printer according to the second embodiment of the invention turns on.

DESCRIPTION OF EMBODIMENTS

Preferred embodiments of a configuration data management system and control method according to the invention are described below with reference to the accompanying figures. Note that a printer is used in the following embodiments as an example of an electronic device in the configuration data management system.

Embodiment 1

Figure 1:
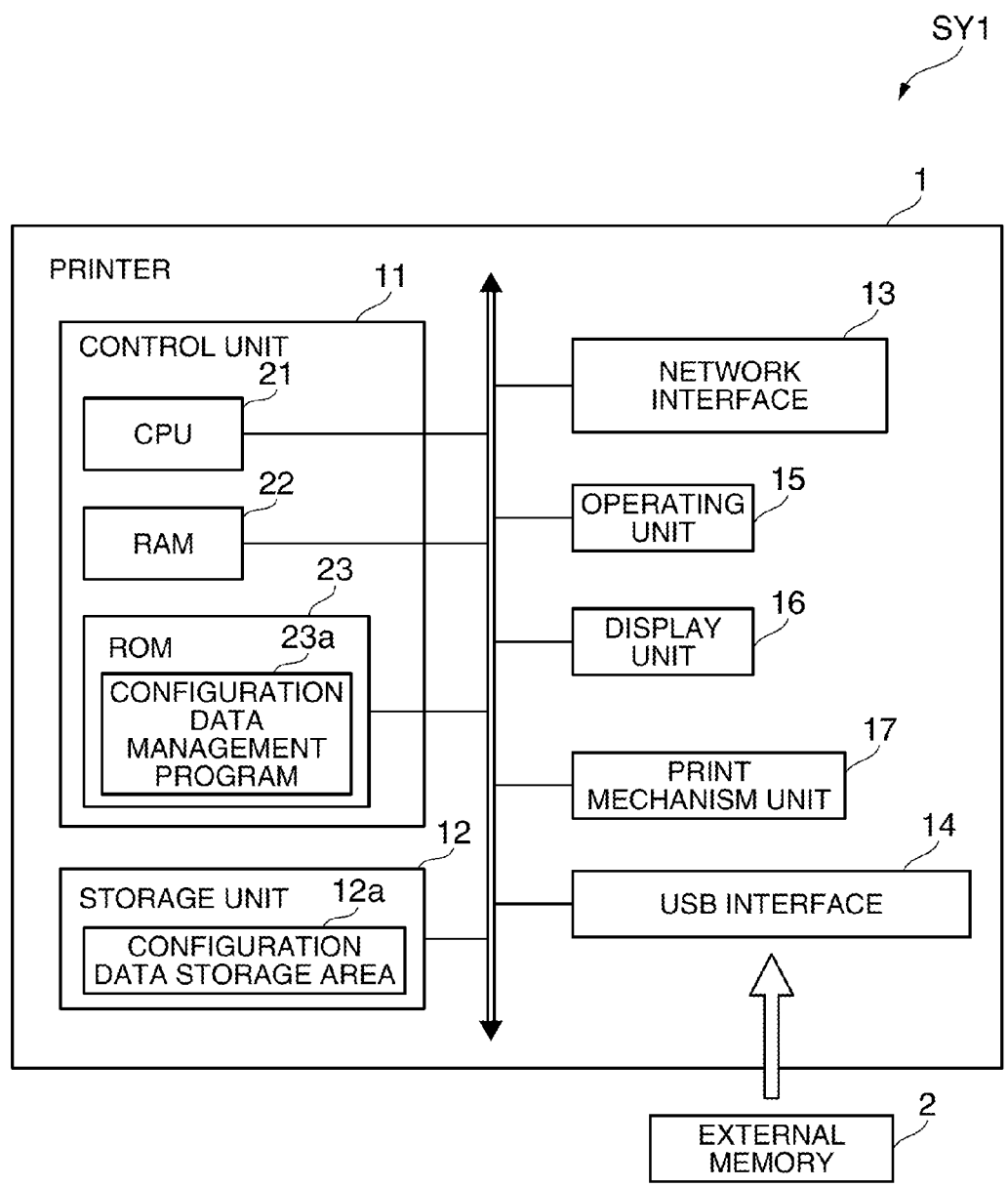
FIG. 1 is a control block diagram of a configuration data management system according to a first embodiment of the invention.

FIG. 1 is a control block diagram of a configuration data management system SY1 according to a first embodiment of the invention. As shown in the figure, the configuration data management system SY1 includes a printer 1 (electronic device), and external memory 2 (external storage device, external storage medium) connected to the printer 1. A USB memory device is used as an example of the external memory 2 in this first embodiment of the invention, but the invention is obviously not so limited and a memory card, floppy disk, or other type of storage may be used.

The printer 1 includes a storage unit 12, network interface 13, USB interface 14, operating unit 15, display unit 16, print mechanism unit 17, and a control unit 11 that controls these other parts.

The storage unit 12 is flash ROM or other type of nonvolatile memory, for example, and has a configuration data storage area 12a for storing the configuration data of the printer 1. This configuration data includes specific information that is uniquely assigned to identify the printer 1, and common information that is shared with another printer (not shown in the figure). Examples of such specific information include an IP address assigned to a particular device, a printer name (computer name), and a UUID (Universally Unique Identifier). Examples of the common information include operating mode settings (such as the color mode or power conservation mode), print quality settings, and communication speed settings for the printer 1.

The network interface 13 is an interface for communicating over a network such as a LAN or the Internet with a personal computer or other information processing device (not shown in the figure).

The USB interface 14 is an interface for connecting the external memory 2 (USB memory).

The control unit 11 reads the configuration data into external memory 2 through the USB interface 14, reads configuration data from the external memory 2, and deletes configuration data from the external memory 2.

The operating unit 15 includes a group of buttons for operating the printer 1, including a power switch for turning the printer 1 power on and off.

The display unit 16 is an LCD device, and is used to configure the printer 1 and to display error messages when a printer 1 error occurs, for example. The print mechanism unit 17 includes a printing mechanism, print medium transportation mechanism, print medium cutting mechanism, and ink supply mechanism (all not shown in the figure), for example, and executes a printing process based on print data.

The control unit 11 includes a CPU 21 (central processing unit), RAM (random access memory) 22, and ROM (read-only memory) 23. The CPU 21 controls printer 1 operation. RAM 22 is used as working memory for the CPU 21 to execute various processes. ROM 23 stores control data and a control program enabling the CPU 21 to execute various processes. The control program includes a configuration data management program 23a.

The configuration data management program 23a is a program for executing processes to store configuration data in external memory 2, or to configure the printer 1 (or restore settings) based on configuration data read from external memory 2. In this embodiment of the invention the configuration data management program 23a is executed when the printer 1 turns on and off.

Figure 2:
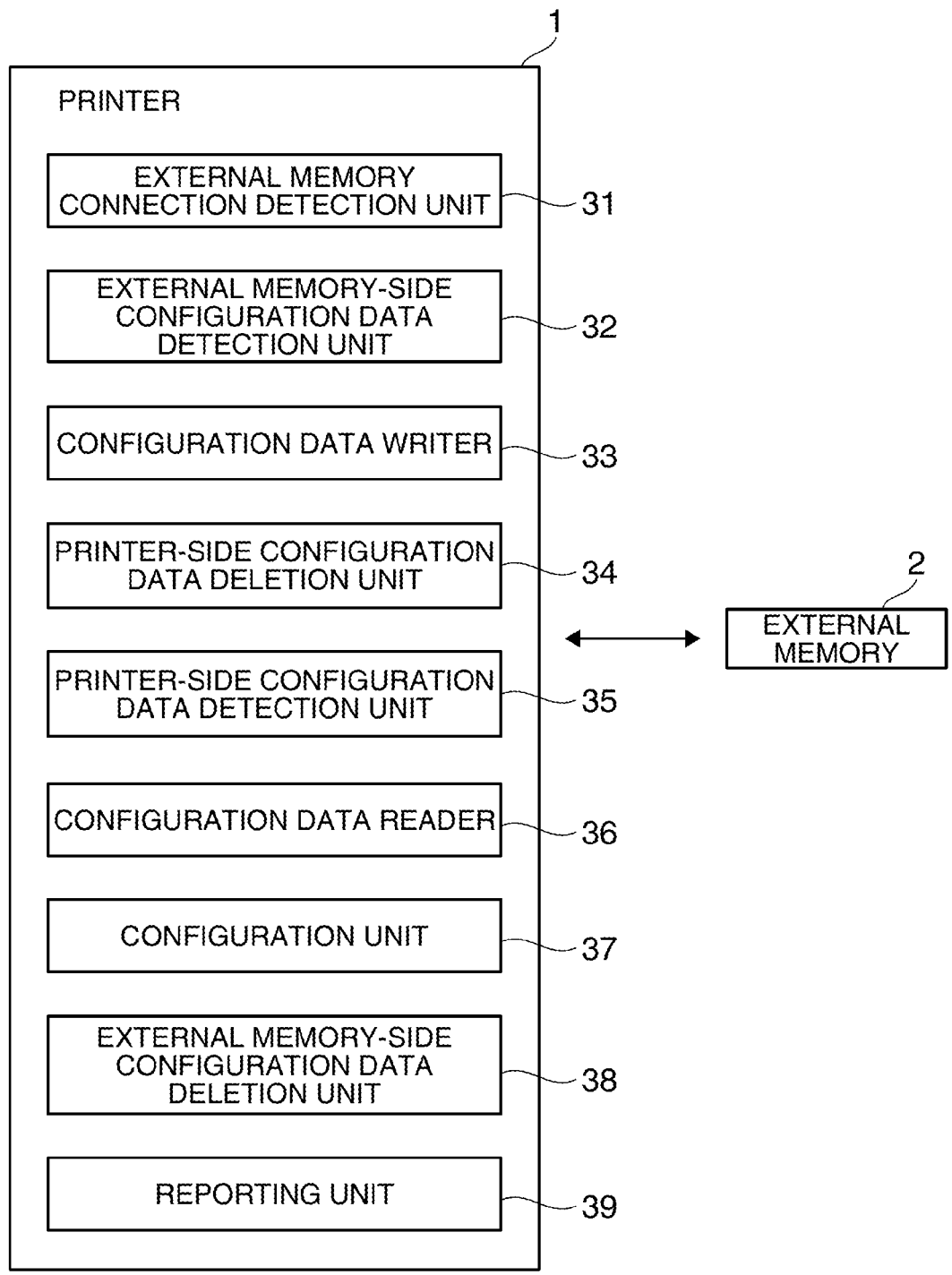
FIG. 2 is a function block diagram of a printer according to the first embodiment of the invention.

The functional configuration of the printer 1 according to the first embodiment of the invention is described next with reference to FIG. 2. The main functional units of the printer 1 include a external memory connection detection unit 31, external memory-side configuration data detection unit 32, configuration data writer 33, printer-side configuration data deletion unit 34 (configuration data updating unit), printer-side configuration data detection unit 35, configuration data reader 36, configuration unit 37, external memory-side configuration data deletion unit 38 (configuration data deletion unit), and reporting unit 39.

The external memory connection detection unit 31 determines if external memory 2 is connected to the printer 1. This determination is made when the printer 1 powers on and when it turns off.

The external memory-side configuration data detection unit 32 determines if configuration data is stored in the connected external memory 2.

The configuration data writer 33 writes (copies) the configuration data stored in the configuration data storage area 12a to external memory 2.

The printer-side configuration data deletion unit 34 deletes the configuration data from the configuration data storage area 12a after the configuration data writer 33 finishes writing the configuration data to external memory 2.

The printer-side configuration data detection unit 35 determines if configuration data is stored in the printer 1. This decision is made when the power turns on.

The configuration data reader 36 reads the configuration data from external memory 2.

The configuration unit 37 configures the printer 1 based on the configuration read from external memory 2 (that is, stores the configuration data read from external memory 2 in the configuration data storage area 12a).

The external memory-side configuration data deletion unit 38 deletes the configuration data stored in the external memory 2 (or deletes only the specific information contained in the configuration data) after the configuration unit 37 completes the configuration process.

Based on the results from the external memory connection detection unit 31, external memory-side configuration data detection unit 32, and printer-side configuration data detection unit 35, the reporting unit 39 displays an error message on the display unit 16 to report the results to the user. Note that this reporting method is not limited to displaying a message on the display unit 16, and information may be reported to the user audibly or using LEDs, for example.

Figure 3:
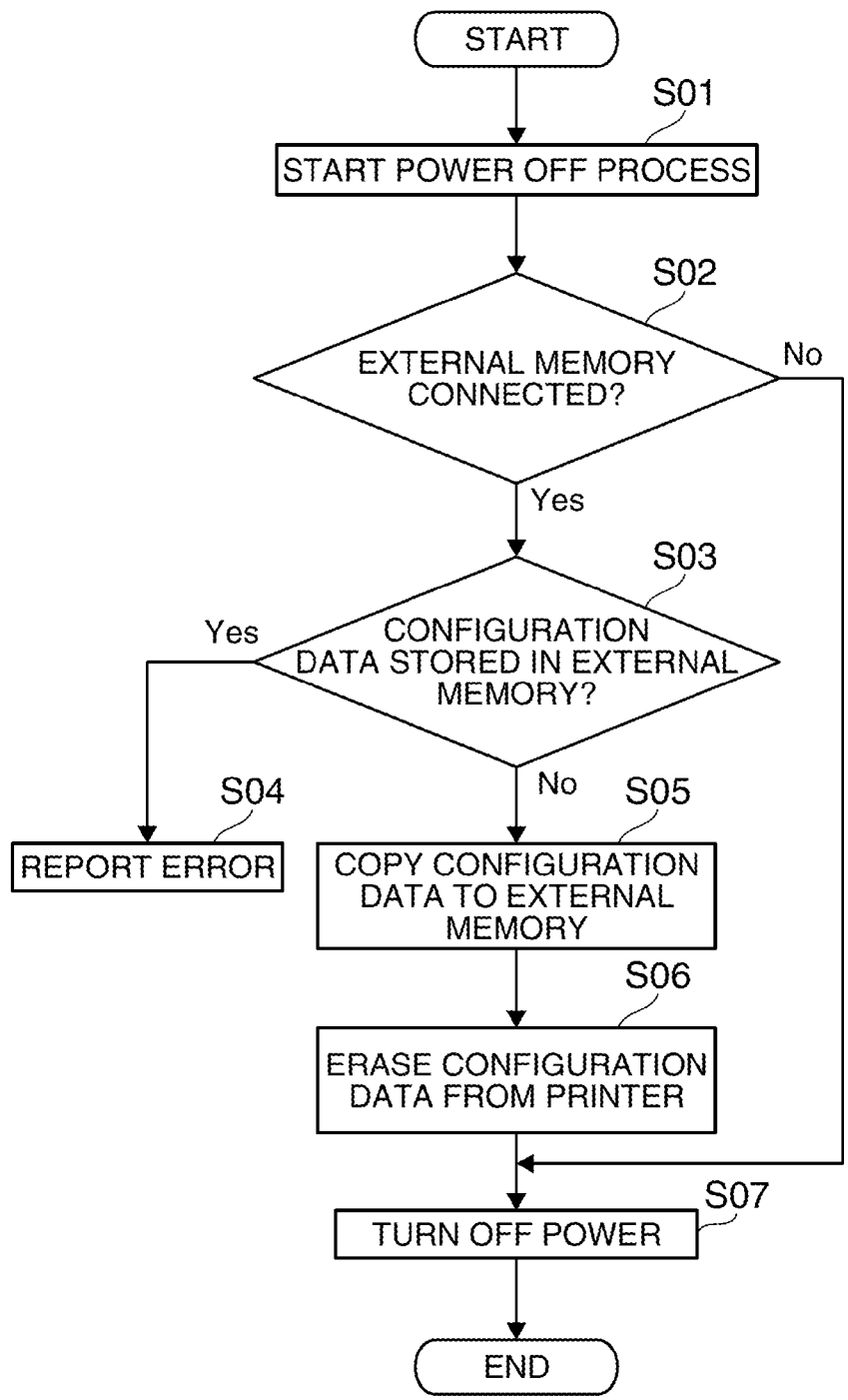
FIG. 3 is a flow chart of a process executed when the printer according to the first embodiment of the invention turns off.
Figure 4:
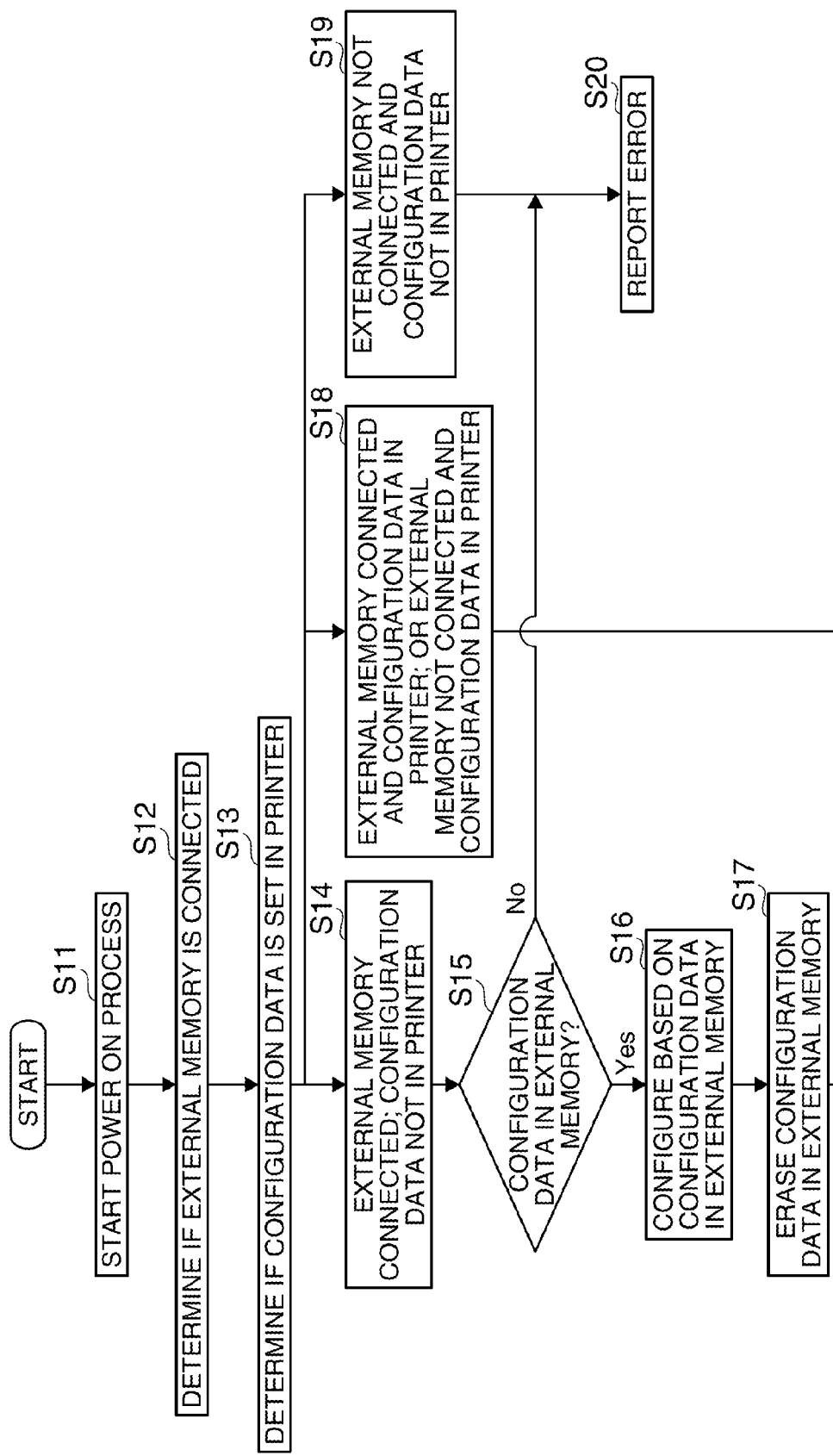

The configuration data management process of the printer 1 according to the first embodiment of the invention is described next with reference to the flow charts in FIG. 3 and FIG. 4. FIG. 3 is a flow chart of the process executed when the printer 1 power turns off.

When a power off request is asserted by the user operating the power switch on the operating unit 15, the printer 1 (CPU 21) starts the power off process (shutdown process) (S01). When this shutdown process starts, the printer 1 determines if external memory 2 is connected. If a external memory 2 is not connected (S02 returns No), the printer 1 turns off (S07).

If external memory 2 is connected (S02 returns Yes), the printer 1 determines if configuration data is stored in the external memory 2. If configuration data is stored in external memory 2 (S03 returns Yes), configuration data is already stored in the external memory 2 and the printer 1 displays an error message indicating that the printer 1 configuration data cannot be stored to the external memory 2 (S04). If configuration data is not stored in external memory 2 (S03 returns No), the printer 1 copies (stores) the configuration data stored in the printer 1 to the external memory 2 (S05). After finishing copying the data to the external memory 2, the printer 1 deletes the configuration data stored in configuration data storage area 12a (S06), and then turns the printer 1 power off (S07).

The process executed when printer 1 power turns on is described next with reference to the flow chart in FIG. 4.

When a power on request is asserted by the user operating the power switch on the operating unit 15, the printer 1 (CPU 21) starts the power on process (startup process) (S11). When this startup process starts, the printer 1 determines if external memory 2 is connected (S12), and determines if configuration data is locally stored (in configuration data storage area 12a) (S13).

If external memory 2 is connected and configuration data is not stored in the printer 1 (S14), the printer 1 determines if configuration data is stored in the external memory 2. If configuration data is not stored in the external memory 2 (S15 returns No), the printer 1 presents an error message indicating that printer configuration is not possible because there is no configuration data in the printer 1 or the external memory 2 (S20).

However, if configuration data is in the external memory 2 (S15 returns Yes), the printer 1 reads the configuration data from the external memory 2 and configures itself based on the configuration data (that is, copies the configuration data from the external memory 2 to configuration data storage area 12a) (S16). After configuration is complete, the printer 1 deletes the configuration data stored in external memory 2 (or deletes only the specific information in the configuration data) (S17), and starts normal operation.

If steps S12 and S13 determine that external memory 2 is connected and configuration data is stored in the printer 1, or determine that external memory 2 is not connected and configuration data is stored in the printer 1 (S18), the printer 1 starts normal operation based on the configuration data stored in the printer 1.

If steps S12 and S13 determine that external memory 2 is not connected and configuration data is not stored in the printer 1 (S19), the printer 1 presents an error message that printer configuration is not possible (S20).

When printer 1 power turns off, the printer 1 according to this embodiment of the invention thus writes the configuration data in the printer 1 to the external memory 2 and then deletes the configuration data in the printer 1. When printer 1 power turns on, the printer 1 copies the configuration data read from the external memory 2 to the printer 1, and then deletes the configuration data from the external memory 2. As a result, the configuration data is stored only in the printer 1 or the external memory 2 (that is, there is always only one copy of the configuration data at any time), and if the external memory 2 is used to configure the printer 1, accidentally configuring plural printers with the same configuration data can reliably be prevented.

In addition, when the printer 1 is replaced, the configuration parameters used to configure the original printer can be easily copied to the replacement printer, which is particularly convenient.

In the first embodiment of the invention the printer configuration is restored using configuration data from external memory 2 only if the configuration data is not already stored in the printer 1 during the startup process executed when printer 1 power turns. As a result, if external memory 2 storing the printer configuration data for another printer is mistakenly connected to a printer 1 that is already configured, changing the correct configuration can be prevented.

Embodiment 2

A configuration data management system SY2 according to a second embodiment of the invention is described next with reference to FIG. 5 to FIG. 10.

The configuration data is stored in external memory 2 (such as USB memory) in the first embodiment described above. This embodiment of the invention differs by using a LAN cable with an attached nonvolatile memory module (external storage device, referred to below as cable set C) and storing the configuration data in the cable set C instead of external memory 2; by first storing the configuration data read from the cable set C into a temporary storage area (temporary area 12b below), and then actually configuring the printer based on the configuration data stored in the temporary storage area; and by deleting the configuration data based on the passage of time. Note that only the differences from the first embodiment are described below. Note, further, that like parts in this and the first embodiment are identified by like reference numerals, and further description thereof is omitted below. Yet further, modifications that are applicable to the same functional parts in the first embodiment can also be applied to this embodiment of the invention.

Figure 5:
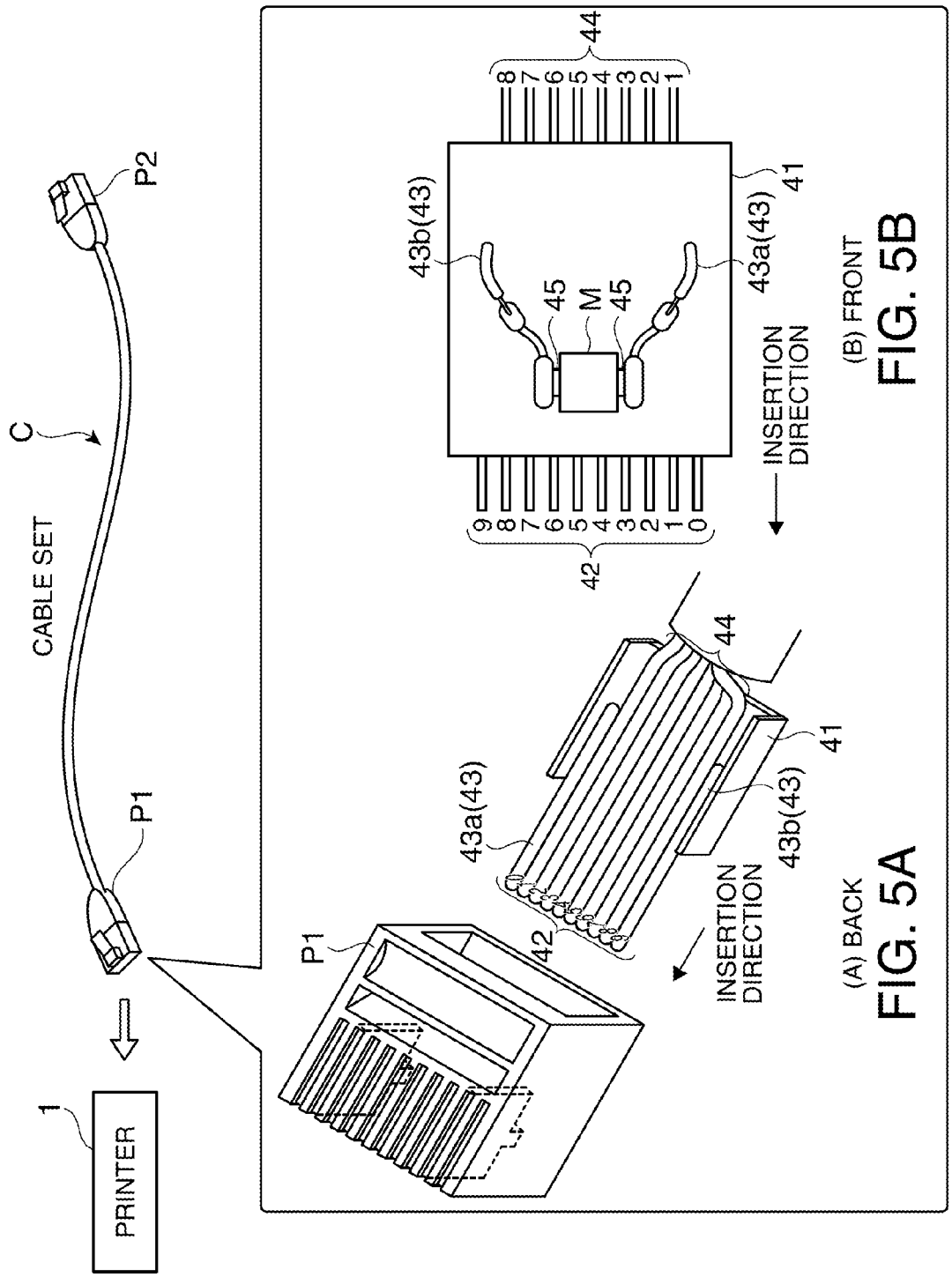
FIG. 5 shows the appearance of a cable set according to a second embodiment of the invention.

The configuration of the cable set C used in this second embodiment of the invention is described with reference to FIG. 5. FIG. 5(A) shows the back of the wire holder 41 when looking at the top of the plug P1 of the cable set C, and FIG. 5(B) shows the front of the wire holder 41 when looking at the bottom of the plug P1. In both FIG. 5(A) and FIG. 5(B) the arrows on the left side point in the direction of insertion to the printer 1.

The cable set C has an RJ45 type plug P1 and P2 (modular connectors) on each end. The printer-side plug P1 has ten pins, and the other plug P2 has eight pins. A nonvolatile memory module M is included in plug P1. Because an RJ45 plug normally has eight pins, a common RJ45 connector can be used for plug P2. The printer-side plug P1 has an extra pin (communication line) disposed on each side of the eight pins in a standard RJ45 plug, and these two pins are used for reading and writing nonvolatile memory module M.

As shown in FIGS. 5(A) and (B), ten communication wires 42 identified as pins 0 to 9 are held on the back side of the wire holder 41 in plug P1. Of these, the eight pins 1 to 8 are standard cable-side communication wires 44 used for standard device-device communication. The two pins 0 and 9 on either side of pins 1 to 8 are dedicated cable-side read/write pins 43a and 43b (43) that are used to read and write to the nonvolatile memory module M (nonvolatile memory 62, see FIG. 6). The dedicated cable-side read/write pins 43a and 43b pass through the back of the wire holder 41 to the outside and are connected to a lead frame 45 formed on both sides of the of the nonvolatile memory module M. The cable connection is therefore made with the eight cable-side communication wires 44 identified as pins 1 to 8.

Figure 6:
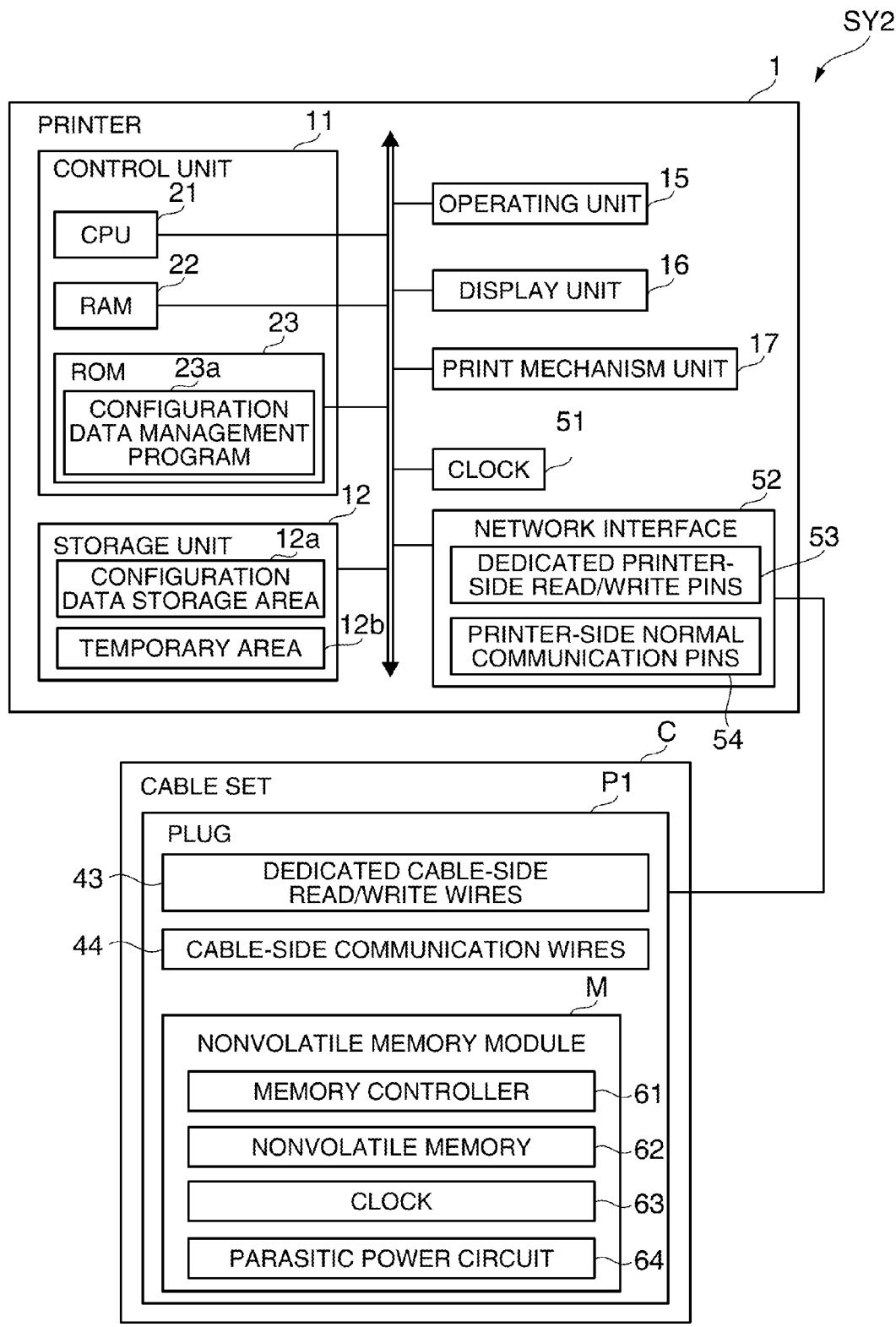
FIG. 6 is a control block diagram of a configuration data management system according to the second embodiment of the invention.

The control configuration of the configuration data management system SY2 according to the second embodiment of the invention is described next with reference to FIG. 6. The printer 1 according to this embodiment of the invention differs from the first embodiment shown in FIG. 1 in that the USB interface 14 is omitted and a clock 51 is added. In addition to configuration data storage area 12a, the storage unit 12 also has a temporary area 12b (temporary storage unit) that temporarily stores configuration data read from the cable set C. The clock 51 is a real-time clock (RTC) that keeps the date and time. In this embodiment of the invention the clock 51 is used to track the timing for deleting configuration data stored in the temporary area 12b in storage unit 12.

The network interface 52 in this second embodiment of the invention enables connecting plug P1 of the cable set C, and includes dedicated printer-side read/write pins 53 and printer-side normal communication pins 54. The dedicated printer-side read/write pins 53 are connected to the dedicated cable-side read/write wires 43, and are used for communication between the printer 1 and the nonvolatile memory module M of the cable set C. The printer-side normal communication pins 54 are connected to the cable-side communication wires 44, and are used for communication between the printer 1 and a device connected to the other end (plug P2) of the cable set C.

As described above, plugs P1 and P2 are attached to opposite ends of the cable set C. Plug P1 includes the dedicated cable-side read/write wires 43, cable-side communication wires 44, and nonvolatile memory module M. The dedicated cable-side read/write wires 43 are the wires of pins 0 and 9 (43a, 43b; see FIG. 5), are connected to the dedicated printer-side read/write pins 53, and are used for communication between the nonvolatile memory module M and printer 1. The cable-side communication wires 44 are the wires of pins 1 to 8, are connected to the printer-side normal communication pins 54 described above, and are used for communication between the printer 1 and a device connected to the plug P2 of the cable set C.

The nonvolatile memory module M includes a memory controller 61, nonvolatile memory 62, clock 63, and parasitic power circuit 64. The nonvolatile memory module M is a 1-Wire device that uses a single line to carry both power and data, and in this embodiment of the invention uses pin 0 of the dedicated cable-side read/write wires 43 (communication line 43a) as the 1-Wire line and pin 9 (communication line 43b) as the ground line. The memory controller 61 controls reading and writing nonvolatile memory 62. The nonvolatile memory 62 stores the configuration data.

The clock 63 is an RTC that counts the date and time. In this embodiment of the invention the clock 63 is used to track the timing for deleting the configuration data in nonvolatile memory 62.

The parasitic power circuit 64 supplies power to the nonvolatile memory module M, and operates for charge capturing during the high level periods of the 1-Wire signal (a variable pulse width serial communication standard for data I/O), and to prevent reverse current and power the device during the low level periods.

Figure 7:
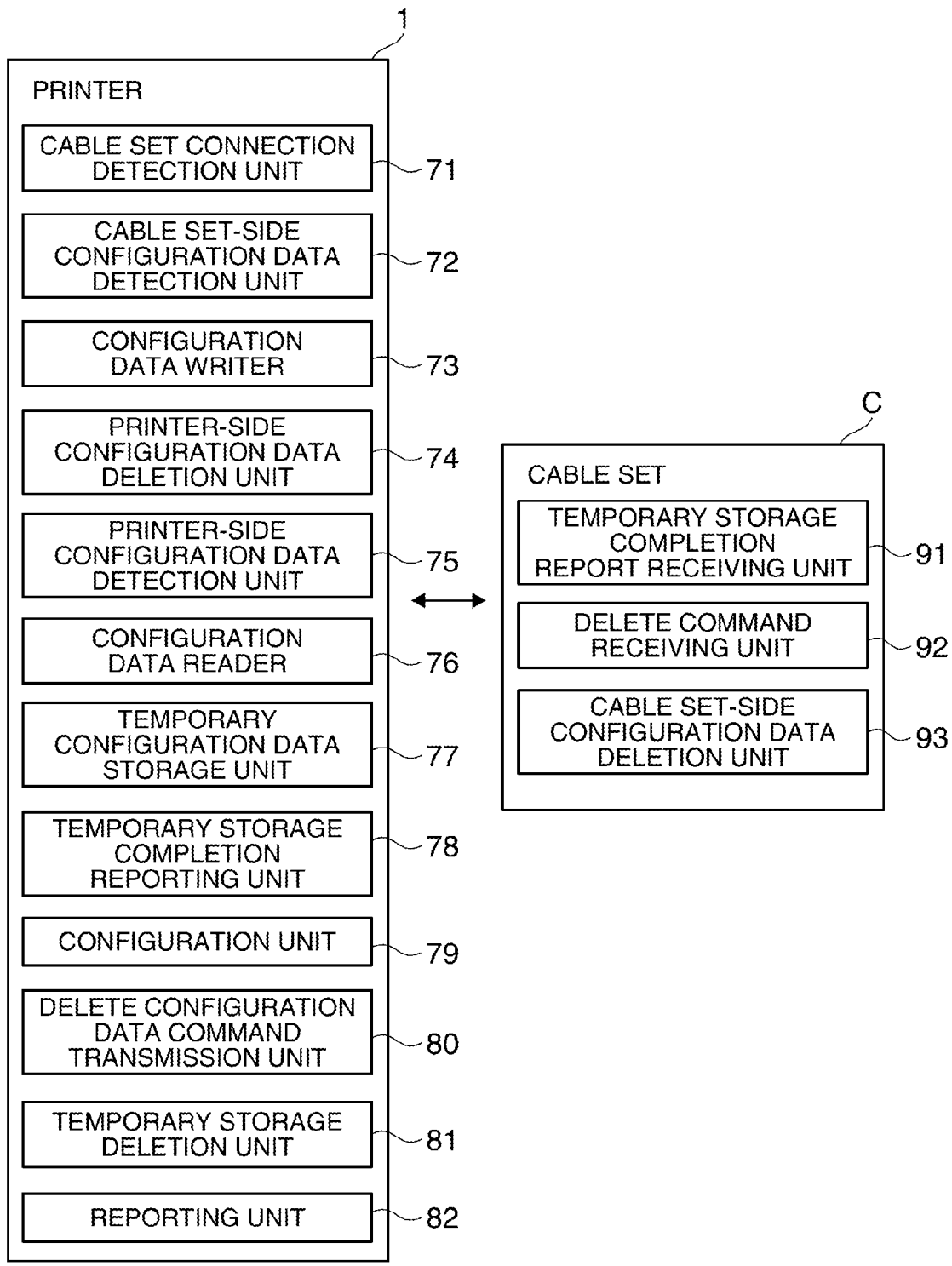
FIG. 7 is a function block diagram of a printer according to the second embodiment of the invention.

The functional configuration of the printer 1 and cable set C of the configuration data management system SY2 according to the second embodiment of the invention is described next with reference to FIG. 7.

The main functional components of the printer 1 include a cable set connection detection unit 71, cable set-side configuration data detection unit 72, configuration data writer 73, printer-side configuration data deletion unit 74 (configuration data updating unit), printer-side configuration data detection unit 75, configuration data reader 76, temporary configuration data storage unit 77, temporary storage completion reporting unit 78, configuration unit 79, delete configuration data command transmission unit 80 (configuration data deletion unit), temporary storage deletion unit 81, and reporting unit 82.

The cable set connection detection unit 71 determines if a cable set C (plug P1) is connected to the printer 1. This decision is made when the printer 1 power turns on and when it turns off.

The cable set-side configuration data detection unit 72 determines if configuration data is stored in the nonvolatile memory 62 of the connected cable set C. The configuration data writer 73 writes (copies) the configuration data stored in the configuration data storage area 12a to the nonvolatile memory 62 of the cable set C, and determines if writing to the nonvolatile memory 62 was completed normally.

The printer-side configuration data deletion unit 74 deletes the configuration data stored in the configuration data storage area 12a after the configuration data writer 73 completes writing the configuration data to nonvolatile memory 62.

The printer-side configuration data detection unit 75 determines if configuration data is stored in the configuration data storage area 12a.

The configuration data reader 76 reads the configuration data from the nonvolatile memory 62 of the cable set C.

The temporary configuration data storage unit 77 stores the configuration data read by the configuration data reader 76 to temporary area 12b.

The temporary storage completion reporting unit 78 reports to the cable set C when the temporary configuration data storage unit 77 has completed writing the configuration data from nonvolatile memory 62 to temporary area 12b (temporary storage completion report).

The configuration unit 79 configures the printer 1 based on the configuration data stored in temporary area 12b. More specifically, the configuration unit 79 copies the configuration data from the temporary area 12b to configuration data storage area 12a.

The delete configuration data command transmission unit 80 sends a delete command for deleting the configuration data stored in nonvolatile memory 62 to the cable set C. Triggered by output of this delete command, the clock 51 starts counting.

The temporary storage deletion unit 81 deletes the configuration data stored in the temporary area 12b a specific time after the delete command is asserted by the delete configuration data command transmission unit 80.

Based on the results from the cable set connection detection unit 71, cable set-side configuration data detection unit 72, and printer-side configuration data detection unit 75, the reporting unit 82 displays an error message on the display unit 16 and reports to the user.

Cable set C includes a temporary storage completion report receiving unit 91, delete command receiving unit 92, and cable set-side configuration data deletion unit 93.

The temporary storage completion report receiving unit 91 receives the temporary storage completion report sent from the printer 1. Triggered by receiving this report, the clock 63 starts counting.

The delete command receiving unit 92 receives the delete command sent from the printer 1.

When a delete command is received by the delete command receiving unit 92, or when a delete command is not received within the specified time after the temporary storage completion report is received by the temporary storage completion report receiving unit 91, the cable set-side configuration data deletion unit 93 deletes the configuration data from the nonvolatile memory 62. As a result, if the cable set C is disconnected from the printer 1 for some reason before the delete command is received from the printer 1, and the delete command does not reach the cable set C, the configuration data can be reliably deleted from the cable set C (nonvolatile memory 62).

The configuration data management process of the configuration data management system SY2 according to the second embodiment of the invention is described next with reference to the flow charts in FIG. 8 to FIG. 10.

Figure 8:
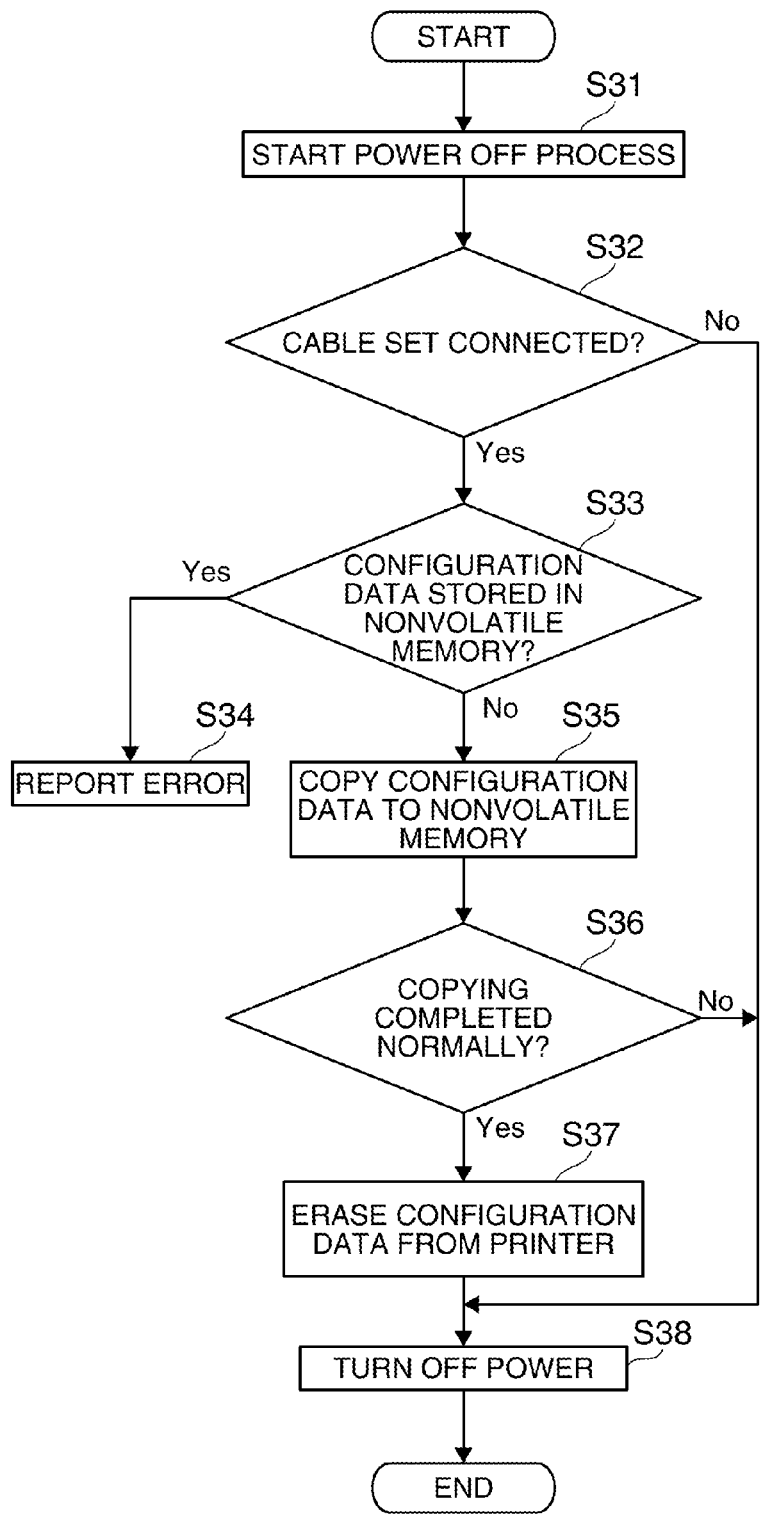
FIG. 8 is a flow chart of a process executed when the printer according to the second embodiment of the invention turns off.
Figure 9:
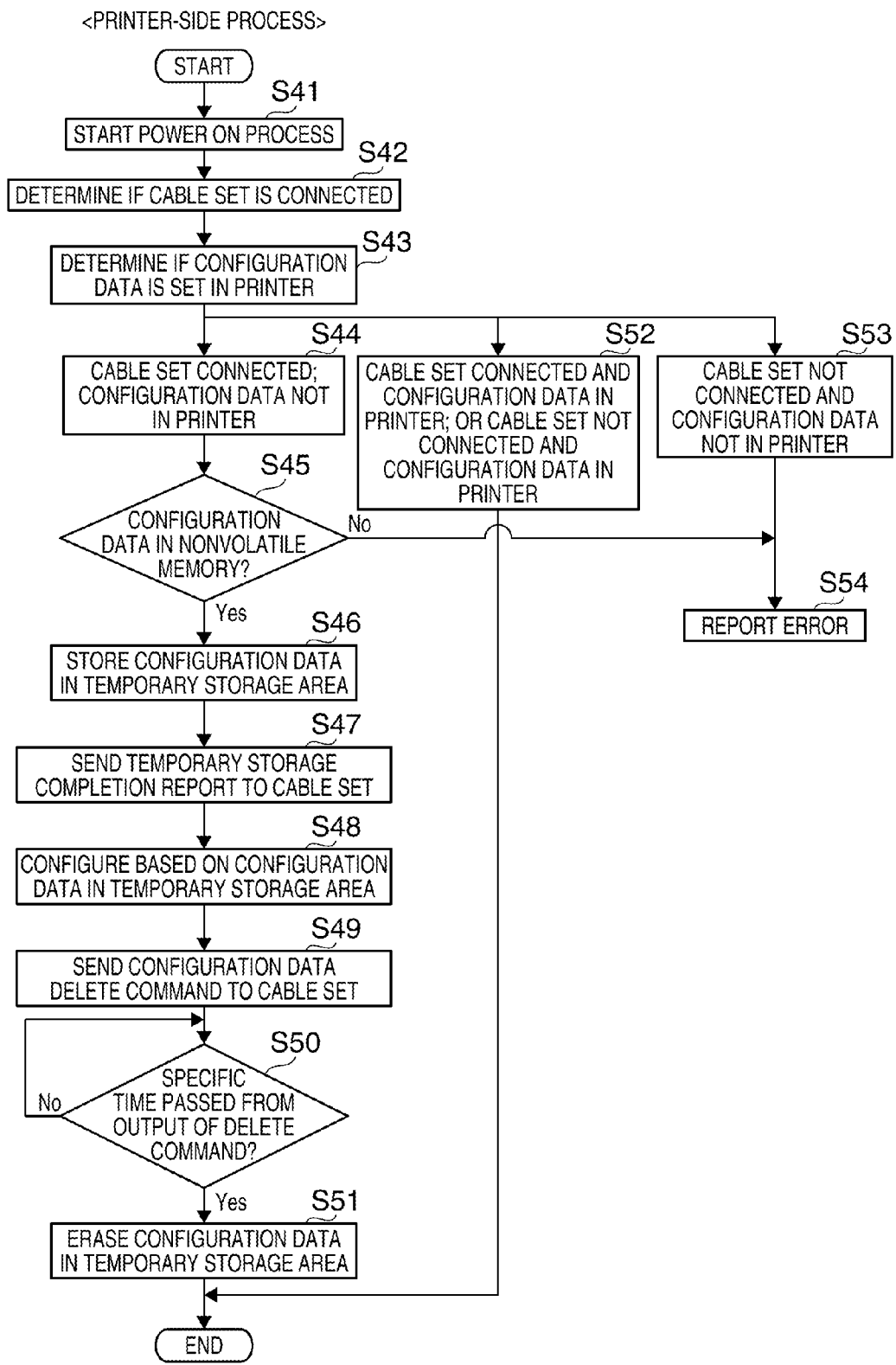

FIG. 8 is a flow chart of the process executed when printer 1 power turns off

When a power off request is asserted by the user operating the power switch on the operating unit 15, the printer 1 (CPU 21) starts the power off process (shutdown process) (S31). When this shutdown process starts, the printer 1 determines if the cable set C is connected. If the cable set C is not connected (S32 returns No), the printer 1 turns off (S38).

If a cable set C is connected (S32 returns Yes), the printer 1 determines if configuration data is stored in the nonvolatile memory 62 of the cable set C. If the configuration data is stored in nonvolatile memory 62 (S33 returns Yes), the printer 1 outputs an error message that the printer configuration data cannot be stored in nonvolatile memory 62 because configuration data is already stored in the nonvolatile memory 62 (S34).

If configuration data is not stored in nonvolatile memory 62 (S33 returns No), the printer 1 copies the configuration data stored in configuration data storage area 12a to nonvolatile memory 62 (S35). The printer 1 then determines if copying to nonvolatile memory 62 was completed normally.

If copying was completed normally (S36 returns Yes), the printer 1 deletes the configuration data stored in configuration data storage area 12a (S37) and turns off (S38). If copying did not complete normally (S36 returns No), the printer 1 turns off without deleting the configuration data from configuration data storage area 12a (S38).

The processes executed when the printer 1 turns on are described next with reference to the flow chart in FIG. 9 and FIG. 10. FIG. 9 is a flow chart of the process executed on the printer 1 side, and FIG. 10 is a flow chart of the process executed on the cable set C side.

When a power on request is asserted by the user operating the power switch on the operating unit 15, the printer 1 (CPU 21) starts the power on process (startup process) (S41). When this startup process starts, the printer 1 determines if the cable set C is connected (S42), and determines if configuration data is locally stored (in configuration data storage area 12a) (S43).

If cable set C is connected and configuration data is not stored in the configuration data storage area 12a (S44), the printer 1 determines if configuration data is stored in the cable set C. If configuration data is not stored in the cable set C (S45 returns No), the printer 1 presents an error message indicating that printer configuration is not possible because there is no configuration data in the printer 1 or the cable set C (S54).

However, if configuration data is in the nonvolatile memory 62 (S45 returns Yes), the printer 1 reads and stores the configuration data from the nonvolatile memory 62 to the temporary area 12b (S46), and sends a report that storage was completed (temporary storage completion report) to the cable set C (S47).

The printer 1 then configures itself based on the configuration data stored in the temporary area 12b (that is, copies the configuration data from temporary area 12b to the configuration data storage area 12a) (S48). After configuration is complete, the printer 1 sends a delete command to the cable set C to delete the configuration data stored in nonvolatile memory 62 (or delete only the specific information in the configuration data) (S49). The printer 1 then waits until a specified time (such as one minute) has passed after sending the delete command (S50 returns No). When the specified time has passed (S50 returns Yes), the printer 1 deletes the configuration data from temporary area 12b (S51).

If steps S42 and S43 determine that cable set C is connected and configuration data is stored in the configuration data storage area 12a, or determine that cable set C is not connected and configuration data is stored in the configuration data storage area 12a (S52), the printer 1 starts normal operation based on the configuration data stored in the configuration data storage area 12a.

If steps S42 and S43 determine that cable set C is not connected and configuration data is not stored in the configuration data storage area 12a (S53), the printer 1 presents an error message that printer configuration is not possible (S54).

Figure 10:
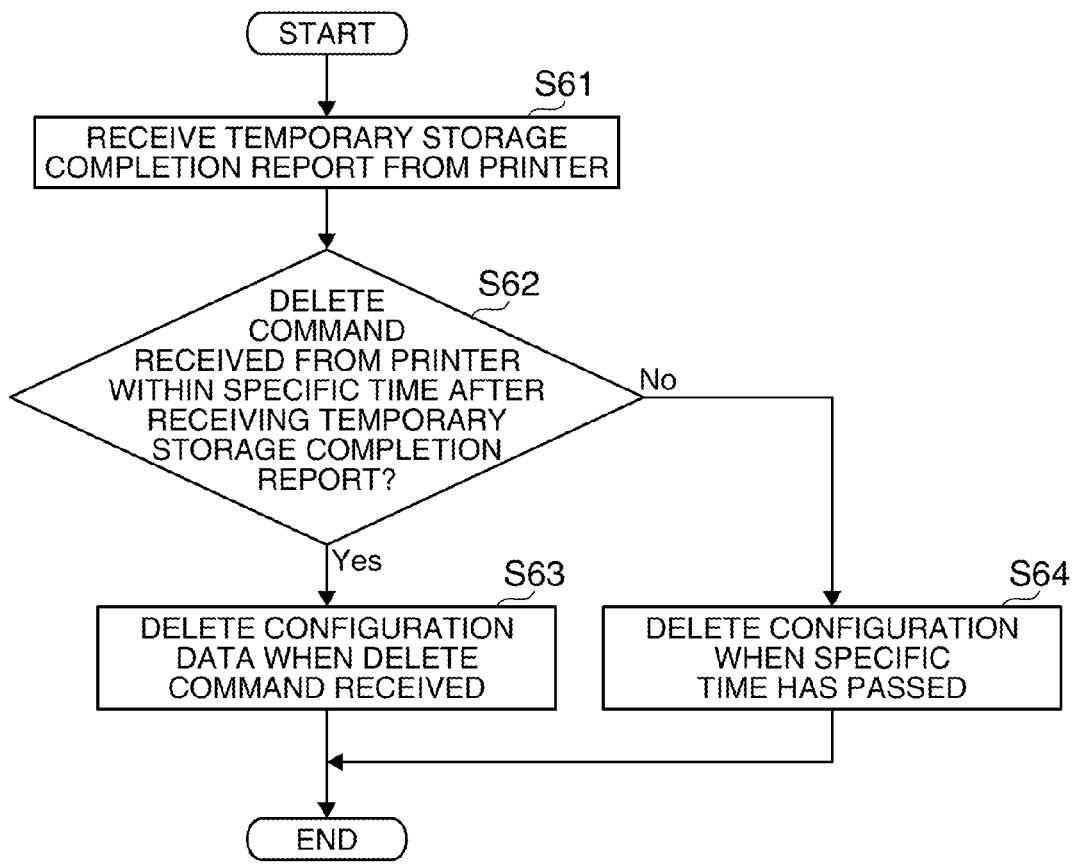

FIG. 10 is described next. As shown in FIG. 10, when the cable set C (memory controller 61) receives the temporary storage completion report from the printer 1 (S61), the clock 63 starts counting. The cable set C then determines if a delete command from the printer 1 was received within a specified time (such as 3 minutes) after the temporary storage completion report was received. If a delete command is received from the printer 1 within the specified time (S62 returns Yes), the cable set C deletes the configuration data from the internal nonvolatile memory 62 when the delete command is received (S63).

If a delete command is not received from the printer 1 within the specified time (S62 returns No), the cable set C deletes the configuration data from the internal nonvolatile memory 62 when a specified time has passed (S64).

In this second embodiment of the invention configuration data read from the cable set C is first written to temporary area 12b, and the printer 1 is configured based on this stored configuration data. As a result, corruption of part of the printer 1 configuration (such as the configuration parameters only be partially set) can thus be prevented even when the configuration data cannot be completely read due to a problem occurring while reading the configuration data from the cable set C (such as the cable set C being unplugged).

When printer 1 power turns off in the embodiments described above, the printer-side configuration data deletion unit 34 (74) copies the printer 1 configuration data to external memory 2 or cable set C (nonvolatile memory 62), and then deletes the printer 1 configuration data (S06 in FIGS. 3 and S37 in FIG. 8), but the invention is not so limited. For example, after copying to the external memory 2 or cable set C, the printer 1 configuration data may be reset to the default configuration. When the printer 1 power turns on in this case, the printer-side configuration data detection unit 35 (75) determines if the printer 1 configuration data is set to the default configuration instead of determining if the configuration data is stored in the printer 1 (S13 in FIGS. 4, and S43 in FIG. 9).

Parts of the printers 1 according to the foregoing embodiments described above can also be rendered as a program. This program can also be provided stored on a recording medium (not shown in the figure). More specifically, a program that causes a computer to function as parts of the printers 1 according to the foregoing embodiments, and a recording medium storing this program, are also included in the scope of the invention.

The electronic device according to the invention can also be applied to devices other than printers 1, and can be varied in many ways without departing from the scope of the accompanying claims.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A configuration data management system comprising: an electronic device; and an external storage device connected to the electronic device; the electronic device including a storage unit that stores configuration data related to the electronic device, a configuration data writing unit that writes configuration data stored in the storage unit to the external storage device when electronic device power turns off, a configuration data updating unit that, after the configuration data is written to the external storage device, executes a deletion process to delete the configuration data in the storage unit, or an initialization process that resets the configuration data in the storage unit to a predetermined default initialization value, a configuration data reading unit that reads the configuration data from the external storage device when electronic device power turns on, a temporary storage unit that temporarily stores the configuration data read by the configuration data reading unit, a temporary storage completion report transmission unit that sends to the external storage device a temporary storage completion report indicating that the configuration data read by the configuration data reading unit was stored in the temporary storage unit, a configuration unit that configures the electronic device based on the configuration data stored in the temporary storage unit, and a configuration data deletion unit that deletes the configuration data stored in the external storage device after the configuration unit completes configuring the electronic device, wherein the external storage device deletes the configuration data stored in the external storage device when a delete command is not received within a specified time after receiving the temporary storage completion report.

2. The configuration data management system described in claim 1, wherein:
the configuration data includes specific information that is uniquely assigned to identify the electronic device; and
the configuration data deletion unit deletes at least the specific information in the configuration data stored in the external storage device.

3. The configuration data management system described in claim 1, wherein:

the configuration unit sets the configuration data read from the external storage device as the configuration data of the electronic device when configuration data is not stored in the storage unit of the electronic device, or when the configuration data stored in the storage unit is the default initialization value.

4. The configuration data management system described in claim 1, wherein:

the configuration data deletion unit issues the delete command to the external storage device to delete the configuration data stored in the external storage device after the configuration unit completes configuration; and the external storage device deletes the configuration data stored in the external storage device based on the command from the configuration data deletion unit.

5. The configuration data management system described in claim 4, wherein:

the electronic device deletes the configuration data stored in the temporary storage unit when a specified time has passed after the delete command is issued.

6. A printer that can connect to an external memory device, comprising: a storage unit that stores configuration data related to the printer; a configuration data writing unit that writes configuration data stored in the storage unit to the external memory device when printer power turns off; a configuration data updating unit that, after the configuration data is written to the external memory device, executes a deletion process to delete the configuration data in the storage unit, or an initialization process that resets the configuration data in the storage unit to a predetermined default initialization value; a configuration data reading unit that reads the configuration data from the external memory device when printer power turns on; a temporary storage unit that temporarily stores the configuration data read by the configuration data reading unit, a temporary storage completion report transmission unit that sends to the external memory device a temporary storage completion report indicating that the configuration data read by the configuration data reading unit was stored in the temporary storage unit, a configuration unit that configures the printer based on the configuration data stored in the temporary storage unit; and a configuration data deletion unit that deletes the configuration data stored in the external memory device after the configuration unit completes configuring the printer, wherein the configuration data stored in the external memory device is deleted when a delete command is not received within a specified time after transmission of the temporary storage completion report.

7. A printer stored in claim 6, wherein:

the configuration data includes an IP address or printer name as specific information that is uniquely assigned to identify the printer; and the configuration data deletion unit deletes at least the specific information in the configuration data stored in the external memory device.

8. A control method for an electronic device that can connect to an external storage device and has a storage unit that stores configuration data related to the electronic device, the control method comprising: a configuration data writing step that writes configuration data stored in the storage unit to the external storage device when electronic device power turns off; a configuration data updating step that, after the configuration data is written to the external storage device, executes a deletion process to delete the configuration data in the storage unit, or an initialization process that resets the configuration data in the storage unit to a predetermined default initialization value; a configuration data reading step that reads the configuration data from the external storage device when electronic device power turns on; a temporary storage step that temporarily stores the configuration data read by the configuration data reading unit, a temporary storage completion report transmission step that sends to the external storage device a temporary storage completion report indicating that the configuration data read by the configuration data reading unit was stored in the temporary storage unit a configuration step that configures the electronic device based on the configuration data stored in the temporary storage unit; and a configuration data deletion step that deletes the configuration data stored in the external storage device after the configuration step completes configuring the electronic device, wherein the configuration data stored in the external storage device is deleted when a delete command is not received within a specified time after transmission of the temporary storage completion report.

9. The electronic device control method described in claim 8, wherein:

the configuration step sets the configuration data read from the external storage device as the configuration data of the electronic device when configuration data is not stored in the storage unit of the electronic device, or when the configuration data stored in the storage unit is the default initialization value.

10. The electronic device control method described in claim 8, wherein:

the configuration data deletion step issues the delete command to the external storage device to delete the configuration data stored in the external storage device after the configuration step completes configuration, and the configuration data stored in the external storage device is deleted based on the command from the configuration data deletion step.

* * * * *